United States Patent [19]
Korth

[11] 4,417,237
[45] Nov. 22, 1983

[54] APPARATUS AND METHOD FOR DETECTING AND INDICATING MISALIGNMENTS OF VEHICLE WIRE SPOKE WHEELS

[76] Inventor: John K. Korth, 904 S. Lancaster St., Mount Prospect, Ill. 60056

[21] Appl. No.: 270,582

[22] Filed: Jun. 4, 1981

[51] Int. Cl.³ ............................................. G08B 21/00
[52] U.S. Cl. ................................ 340/686; 33/203.16; 340/540
[58] Field of Search ................. 340/686, 540; 33/203, 33/203.12, 174 Q, 203.16

[56] References Cited

U.S. PATENT DOCUMENTS

| | | | |
|---|---|---|---|
| 3,751,563 | 4/1976 | Ravenhall | 33/174 Q |
| 4,126,942 | 11/1978 | Damman | 33/203.12 |
| 4,143,464 | 3/1979 | Lahos | 33/203.16 |

*Primary Examiner*—Glen R. Swann, III
*Attorney, Agent, or Firm*—Bernard L. Kleinke

[57] ABSTRACT

An apparatus includes having a pair of spaced-apart right and left misalignment sensors which are adapted to be positioned on opposite sides of the wheel under test, and an electrical circuit for producing electrical signals when misalignments are sensed and for supplying them to a pair of visible light-emitting indicating devices which, in turn, provide visually discernible misalignment indicating information in response to the electrical signals. The method for detecting and indicating wheel misalignments includes the steps of placing the wheel between two spaced-apart oppositely-disposed misalignment sensors, rotating the wheel about its axis, producing electrical signals in response to the sensors detecting wheel misalignments, and observing indicating devices which respond to the electrical signals when the sensors detect misalignments of the wheel. In one form of the invention, the sensors each include a spring-loaded probe, and in the other two disclosed forms of the invention, the electrical circuit includes voltage-controlled oscillators.

10 Claims, 6 Drawing Figures

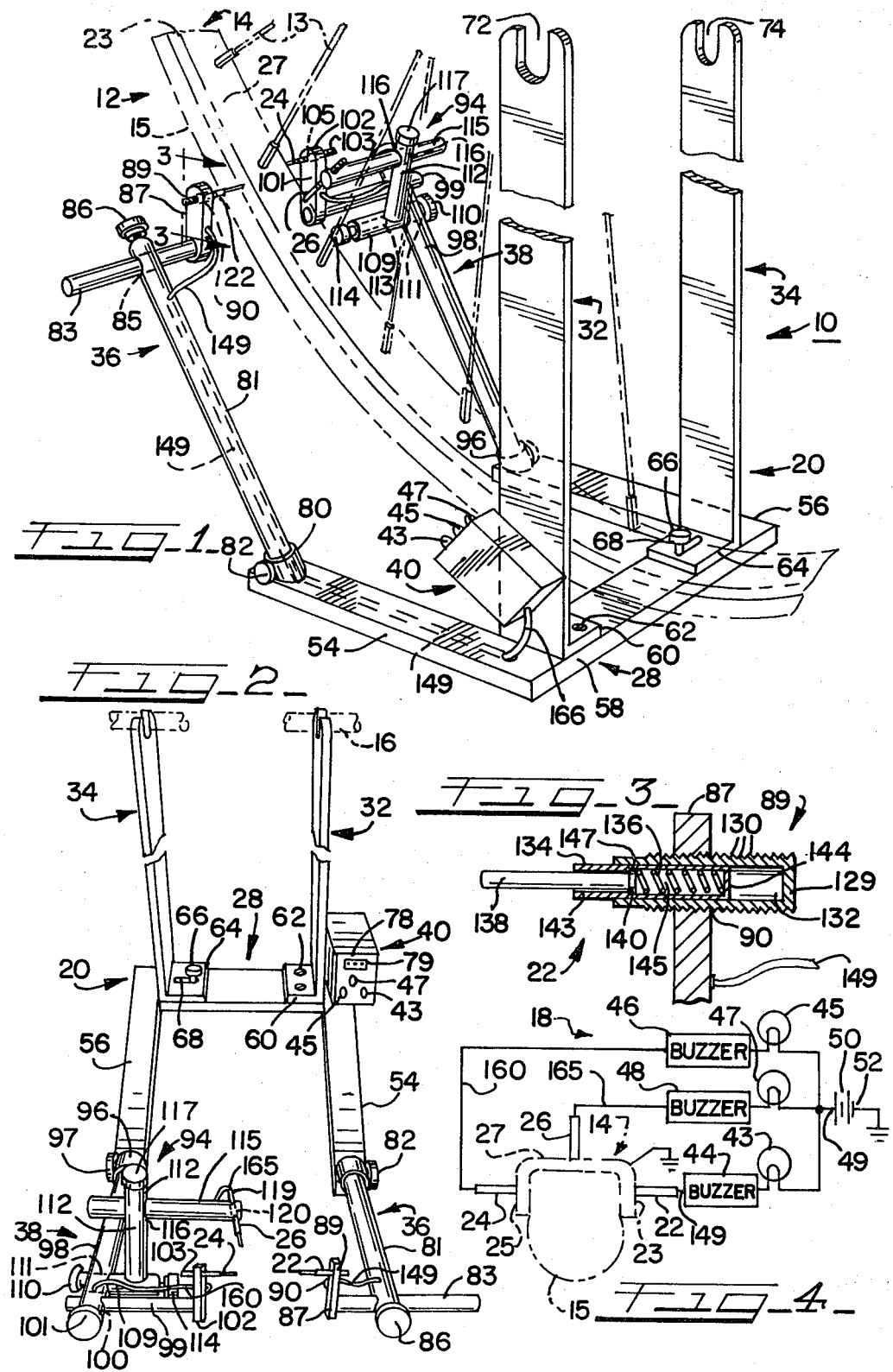

APPARATUS AND METHOD FOR DETECTING AND INDICATING MISALIGNMENTS OF VEHICLE WIRE SPOKE WHEELS

TECHNICAL FIELD

The present invention relates, in general, to an apparatus and method for detecting and indicating misalignments of vehicle wire spoke wheels, such as spoke wheels used on bicycles and motorcycles, and it more particularly relates to a method and apparatus for detecting and indicating both lateral and radial misalignments of such wheels.

BACKGROUND ART

The rim of a wire spoke wheel can be misaligned relative to its axle or spindle in two important aspects, and in each case, adjustment is required. Firstly, the wheel rim can be radially or concentrically misaligned and thus be out-of-round, non-circular, or even egg-shaped. Secondly, each side of the wheel rim can have portions thereof disposed at varying distances from a central reference plane normal to the wheel axle and thus the rim can be laterally misaligned or "out-of-true". Where a wheel is laterally misaligned, the rim portions can be displaced laterally to either side of the reference plane thereby causing such a wheel to be "wobbly".

Gross misalignments oftentimes occur when the wheel is first assembled by "lacing" the spokes through the wheel hub and rim. Also, misalignments can occur after a properly assembled wheel is used and thus subjected to road shocks and stresses. Misaligned wheels are undesirable, because an egg-shaped wheel causes a bumpy ride and can collapse, and a wobbly wheel, in addition to giving an unsatisfactory ride, can cause brakes, of the rim-engaging type, to clamp improperly. Therefore, it is desirable to regularly inspect wire spoke wheels and remove all misalignments therefrom by adjusting the tension of the spokes with a conventional spoke wrench. The technique of aligning wire spoke wheels, particularly bicycle wheels, is conventionally referred to as "truing" the wheel.

Spoke wheels have been aligned by mounting them on a stand for rotation about their axes and then by positioning an indicating device or apparatus opposite the wheel rim. Misalignments of the wheel are then checked by the indicating device, while manually rotating the wheel. Proper alignment can then be carried out by adjusting the tension of the spokes.

Many different types and kinds of wheel alignment indicating devices are known in the art. The simplest type of device generally includes a pair of fingers, such as nails, positioned adjacent the opposite sides of, and near to, the rim to detect lateral misalignments thereof. Misalignments are indicated audibly by the sound of the fingers scraping the portions of the rim as the wheel is rotated about its axis and wobbles from side to side. However, such audible indications are oftentimes ambiguous in that a difficult judgment must be made as to which side of the rim caused the scraping sound. Additionally, the mechanical interactions between the fingers and the rim are not very precise and sometimes difficult to detect, thus making it difficult, if not impossible, to obtain an indication of small or minor misalignments.

In a more elaborate prior-known apparatus, at least one stand-mounted dial indicator gauge is used to provide a visual, numerical indication of misalignment. While such an apparatus is highly accurate to use, it is very expensive. Furthermore, if only one gauge is utilized, it can be difficult, if not impossible, to obtain usable readings where the wheel being tested is greatly out-of-true. With such a grossly misaligned wheel, the rim can wobble so far away from engagement with the dial indicator gauge probe during rotation of the wheel, that meaningful indications of out-of-trueness cannot be obtained. Also, with only one gauge, thick or thin portions of the rim due, for example, to welds, are not at all readily detectable, thereby resulting in inaccurate adjustments. Moreover, using only one gauge, it is difficult, if not impossible, to detect simultaneously both out-of-trueness and out-of-roundness. In this regard, in order to detect out-of-roundness, the tire is sometimes removed from the rim and such removal and subsequent replacement is time-consuming and inconvenient.

The use of two or more dial indicator gauges can alleviate the foregoing problems, but this increases correspondingly the complexity and cost of the apparatus. Furthermore, if a pair of spaced-apart dial indicator gauges are mounted on opposite sides of the rim to detect lateral misalignment as the rotating wheel wobbles from side to side, simultaneous readings of both gauges by a single observer is not possible. Thus, the head of the observer must move from one side of the wheel to the other alternatingly as the wheel rotates to determine which side of the rim is deviating too far away from the common transverse plane of reference. Moreover, inaccuracies result from the initial set up of the equipment, in that zero readings for the gauges can only be estimated.

A highly precise and accurate method and apparatus for indicating misalignments in wire spoke wheels is disclosed in U.S. Pat. No. 4,216,942. However, the apparatus employs complex, expensive linkages, and is unable to provide simultaneous indications. Also, complex and time-consuming set-up procedures are required.

In U.S. Pat. No. 4,143,464, there is disclosed a spoke wheel alignment checking apparatus, which checks one side only of the rim. The apparatus disclosed in U.S. Pat. No. 3,951,563 detects radial displacements of a disc wheel using a transducer for producing a continuous analog signal representative of the exact shape of the outer periphery of the wheel, whereby the signal is supplied to a computer for controlling the operation of a central hole borer for the wheel; however, no lateral misalignments are detected.

It would be highly desirable to have a relatively inexpensive apparatus and a convenient to use method for detecting and indicating simultaneously various types of misalignment of a wheel in a highly accurate manner. Such an apparatus and method should provide indications of misalignments in an accurate and unambiguous manner, while distinguishing the type of misalignment present in a given portion of a tire-mounted wheel rim under test. Moreover, misalignment indications should be given for both grossly and only slightly misaligned wheels. Also, such apparatus should be able to be used independently of a stand, and thus could be sold for use with existing stands.

DISCLOSURE OF THE INVENTION

Therefore the principal object of the present invention is to provide an apparatus and method for accurately and sensitively detecting wheel misalignments and for producing clearly understandable and easily discernible indications of the misalignments.

Another object of the present invention is to provide such new and improved apparatus which is relatively simple in construction and very convenient to use, and which can be manufactured at low cost.

Yet another object of the present invention is to provide such an apparatus and method for detecting either gross misalignments, such as can be present in a newly-laced wheel, or minor misalignments, such as can occur after a wheel has been in use.

SUMMARY OF THE INVENTION

The above and further objects of the present invention are realized by providing an apparatus having a pair of spaced-apart right and left misalignment sensors which are adapted to be positioned on opposite sides of the wheel under test for producing electrical signals when misalignments are sensed and for supplying them to a pair of indicating devices which, in turn, provide misalignment indicating information in response to the electrical signals. Each one of the signals is produced when the rim moves through a predetermined distance toward the sensor to a certain position, and the signal is terminated when the rim moves backwardly past the certain position. The method for detecting and indicating wheel misalignments includes the steps of placing the wheel between two spaced-apart oppositely-disposed misalignment sensors, rotating the wheel about its axis, producing electrical signals in response to the sensors detecting wheel misalignments, and observing indicating devices which respond to the electrical signals when the sensors detect misalignments of the wheel.

In a preferred embodiment of the present invention, an additional sensor and indicating device are provided for sensing radial misalignments and for providing simultaneous radial misalignment indicating information. Also, sound-emitting indicating devices are provided to give audible indications which are distinguishable for each type of misalignment: right lateral, left lateral or radial.

The sensitive electrical circuit of the present invention makes possible the use of sensors capable of detecting small amounts of misalignment. The circuit also makes possible the use of indicators, which produce clearly discernible information in the form of light or sound, or both, concerning wheel misalignments. Such indicators can be readily perceived even in dimly lit or noisy environments.

BRIEF DESCRIPTION OF THE DRAWINGS

The above-mentioned and other objects and features of this invention and the manner of attaining them will become apparent, and the invention will be best understood by reference to the following description of embodiments of the invention taken in conjunction with the accompanying drawings, wherein:

FIG. 1 is a partly fragmentary pictorial view, of a wire spoke wheel misalignment detecting and indicating apparatus, which is constructed in accordance with this invention, and which is shown operatively associated with a wire spoke wheel shown fragmentarily and in phantom lines for illustrative purposes;

FIG. 2 is another partly fragmentary pictorial view, taken from another perspective, in slightly reduced scale, of the apparatus of FIG. 1;

FIG. 3 is a sectional view of a sensor, taken substantially along the line 3—3 of FIG. 1 in an enlarged scale;

FIG. 4 is a schematic diagram of a misalignment detecting and indicating circuit of the apparatus of FIG. 1, with the sensors shown schematically in operative engagement with the rim of a tire-carrying wheel, which is shown in cross section, in phantom lines, for illustration purposes;

BEST MODE OF CARRYING OUT THE INVENTION

Figure 5:
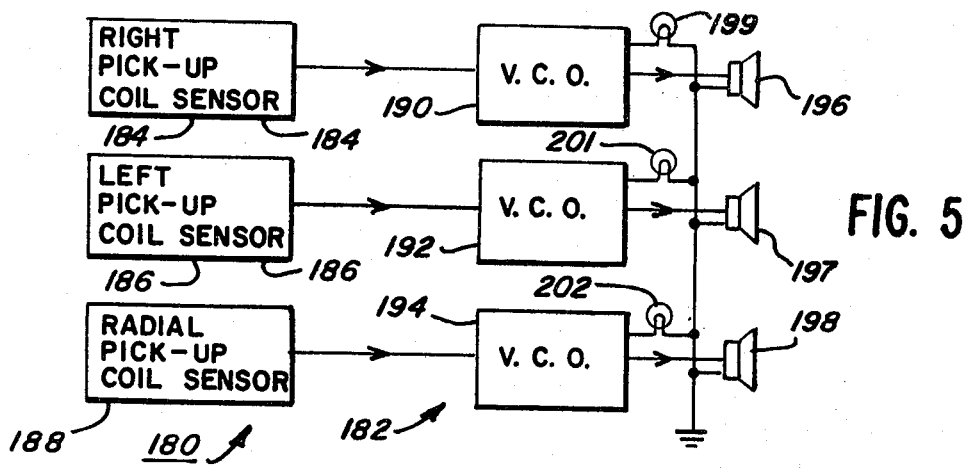
FIG. 5 is a schematic diagram of another wire spoke wheel misalignment detecting and indicating apparatus, which is also constructed in accordance with the present invention.

Referring now to the drawings and more particularly to FIGS. 1, 2 and 4 thereof, there is shown an apparatus 10 which is constructed in accordance with the present invention and which is shown in operative position for detecting and indicating misalignments of a conventional bicycle wire spoke wheel 12 fitted with a tire 15 and including metal spokes 13, and a metal rim 14. The wheel 12 has a metal axle 16, the wheel and axle shown fragmentarily in phantom lines. It is to be understood that it will become apparent to those skilled in the art that the wheel 12 may be a bicycle wheel, a motorcycle wheel, or other wire spoke wheels.

The apparatus 10 includes a circuit 18, shown schematically in FIG. 4, mounted, in part, at the bottom portion of a wheel supporting stand 20, shown in FIGS. 1 and 2. It will become apparent to those skilled in the art that the circuit of the present invention does not need to be mounted on a stand and it can be sold separately for use on existing conventional stands. The circuit 18 includes left and right lateral misalignment sensors 22 and 24 mounted in a spaced apart, oppositely-disposed configuration for engaging opposite sides of the rim 14, and a radial misalignment sensor 26 positioned to the rear of the sensors 22 and 24 for engaging the inner spoke-receiving periphery 27 of the rim 14 of the wheel 12.

The stand 20 includes a base 28 having left and right parallel spaced-apart metal upright wheel axle supports 32 and 34 for holding at the upper ends thereof, the axle 16 (FIG. 2) therebetween, and has left and right sensor support assemblies 36 and 38 for positioning the sensors 22, 24 and 26 relative to the wheel under test. An indicator mounting or housing 40 is fixed near the bottom end of the axle support 32, and as shown in FIG. 4, has a set of right, left and radial alignment indicating devices in the form of close-spaced visible light-emitting lamps or indicators 43, 45 and 47, respectively, and in the form of a set of sound-emitting devices or buzzers 44, 46 and 48, respectively, which produce audibly distinguishable tones or sounds. The indicating devices are connected electrically to the respective sensors 22, 24 and 26, as shown in FIG. 4.

In operation, the wheel 12 is rotatably mounted on the stand 20 with its axle 16 supported fixedly in a conventional manner by the supports 32 and 34. The right and left sensors 22 and 24 are positioned adjacent to opposite sides 23 and 25, respectively, of the rim 14. The radial sensor 26 is positioned adjacent to the inner periphery 27 of the rim 14. The right, left and radial sensors are each positioned apart from the wheel a predetermined distance. The wheel is then rotated manually about its axis so that any lateral or radial wheel misalignments cause the rim to move toward one or more of the sensors 22, 24 and 26, which thereby detect a misalignment of that portion of the rim. As hereinafter described in greater detail, electrical signals are produced in response to the detected misalignments, and are conveyed, in the circuit 18, shown in FIG. 4, to the indicating devices 43, 44, 45, 46, 47 and 48 to cause them to provide information, in a convenient manner, regarding the misalignment of the wheel.

The misalignment information allows the operator to determine whether or not a misalignment is present in that portion of the rim moving opposite the sensors. If a misalignment is detected, the misalignment information also allows the operator to know what type of misalignment is sensed; namely, right lateral, left lateral or radial misalignments. The location of the misaligned portion of the rim is that portion which is in contact with the sensor whose associated indicators are providing information. Thus, a person testing a wheel has the necessary information, obtained in a convenient manner, needed to correct the misalignment by properly adjusting the tension of the appropriate spokes in a conventional manner.

As is shown schematically in FIG. 4, in the circuit 18, the sensor 22 is electrically connected in series through the series-connected buzzer 44 and lamp 43 to a terminal 49 of an electrical potential source or battery 50. Similarly, the sensor 24 is connected electrically in series through the series circuit of the buzzer 46 and the lamp 45 to the terminal 49. Also, in a similar manner, the sensor 26 is connected to the buzzer 48, the lamp 47 and the terminal 49.

While both buzzers and lamps are employed, it will become apparent to those skilled in the art that only one type of indicating device may be employed.

A terminal 52 of the source 50 and the metal rim 14 of the wheel 12 are grounded, so that when the sensors are in electrical contact or engagement with the rim 14, electrical circuit paths are established between the rim 14, the sensors, the indicating devices, and the battery 50 to produce right, left and radial electrical signals, whereby the indicating devices are activated to provide right, left and radial misalignment indicating information.

Considering now the stand 20 in greater detail, with reference to FIGS. 1 and 2, the base 28 is generally U-shaped and includes spaced apart, parallel elongated left and right foot members 54 and 56 integrally connected at their rear ends to a cross member 58. The base 28 is adapted to rest on a support surface (not shown) during operation of the apparatus of this invention.

The upright wheel axle supports 32 and 34 are parallel spaced-apart bars. The lower end of the support 32 is fixed to the cross member 58 by means of an integral inwardly-extending right angle flange 60, which is fixed to the cross member 58 by means of a pair of bolts 62 threaded into aligned holes (not shown) in the flange 32 and the cross member 58. The support 34 is positionally adjustable relative to the support 32, and has at its lower end an integral inwardly-extending right angle flange 64, which is fixed adjustably to the cross member 58 by means of a setscrew 66 extending rotatably freely through an elongated slot 68 in the flange 64 and threaded into a tapped hole (not shown) in the cross member 58. The axle supports 32 and 34 are spaced apart adjustably to accommodate therebetween standard size front bicycle wheels or rear wheels having mounted thereon freewheel gear clusters (not shown) therefor.

The supports 32 and 34 are adapted to hold a wheel axle by means of opposing open axle receiving slots 72 and 74 in the upper ends of supports 32 and 34, respectively. The width and depth of the slots 72 and 74 are dimensioned to accept standard size bicycle axles. The slots 72 and 74 are disposed at a distance above the cross member 58 sufficient to allow unimpeded rotation of a standard size bicycle wheel tire combination when the axle 16 thereof rests in the slots 72 and 74, as indicated in phantom lines in FIG. 2.

The indicator mounting 40 has its longitudinal axis at an acute angle relative to the foot member 54 so that a front indicator-carrying wall 78 of the mounting 40 faces forwardly and upwardly to be conveniently observable by an operator adjusting the wheel 12 on the stand 20. As shown in FIG. 2, a grille 79 in the wall 78 permits the sound of the buzzers 44, 46 and 48 to pass therethrough.

The lamps 43, 45 and 47 are mounted on the wall 78 and are closely spaced in a triangular array so that all three are observable with one fixation of an observer's gaze. The operator can observe conveniently all three devices simultaneously without having to move the head or to shift the vision of the eyes from one device to another, as required by some prior known devices, such as a pair of dial indicator gauges.

The left sensor support assembly 36 is upright and is inclined forwardly from the forward end of the left foot member 54. The assembly 36 includes a tubular collar 80 which is fixedly attached to the forward end of the left foot 54 and extends outwardly and upwardly therefrom for holding releasably the lower end of a cylindrical positioning rod 81 by means of a setscrew 82.

A cylindrical rod 83 is journaled in a crosshole 85 in the rod 81 adjacent the upper end thereof and is releasably secured in the crosshole 85 by a setscrew 86 extending through a tapped hole (not shown) in the end of the rod 81. Releasing the setscrew 86 permits the rod 83 to be rotated or longitudinally moved, or both, in the crosshole 85, to provide a coarse positional adjustment to be made of the position of the sensor 22 relative to the adjacent side 23 of the rim 14.

A transverse elongated member 87 is attached, at one of its ends, at right angles to the inner end of the rod 83. A fine adjustment sensor carrier 89 is threaded longitudinally through a tapped crosshole 90 in the upper end of the member 87 to permit fine positional adjustments of the sensor 22 relative to the side 23 of the rim 14 to be made by threadably moving the carrier 89, within the crosshole 90 toward or away therefrom.

The right sensor support assembly 38 extends parallel to and is similar to the left assembly 36, except that the assembly 38 includes a radial sensor support subassembly 94. The assembly 38 includes a tubular collar 96 fixedly attached to the forward end of the right foot 56 and extending outwardly and upwardly therefrom for releasably holding the lower end of a cylindrical positioning rod 98 by means of a setscrew 97.

A cylindrical rod 99 is journaled in a mounting crosshole 100 (FIG. 2) in the rod 98 near the upper end thereof and is releasably secured in the hole 100 by a setscrew 101. In a manner similar to that used with the rod 83, the rod 99 permits a coarse adjustment of the position of the sensor 24 relative to the side 25 of the rim 14 to be made by releasing the setscrew 101 and rotating or moving longitudinally, or both, the rod 99 in the hole 100.

A transverse elongated member 102 is fixedly attached, at its lower end, at right angles to the inner end of the rod 100. A fine adjustment sensor carrier 103 is threaded longitudinally through a tapped crosshole 105 in the upper end of the member 87 to permit fine adjustments of the sensor 24 relative to the adjacent side 25 of the rim 14 to be made by threadably moving the carrier 103 within the crosshole 105.

The radial sensor support subassembly 94 permits adjustment of the position of the sensor 26 relative to the inner periphery of the rim 14. A cylindrical horizontal adjustment rod 109 has its outer end abutting the rod 98 at a location intermediate the rod 99 and collar 96; the longitudinal axes of the rod 109 and the rod 98 are disposed substantially at right angles. The rod 109 is rotatably adjustable about its longitudinal axis and is held releasably in place by means of a setscrew 110 which extends into a crosshole 111 in the rod 98 and which is received in a tapped hole (not shown) extending longitudinally into the rod 109 from its outer end. Releasing the setscrew 110 permits the rod 109 to rotate about its longitudinal axis; tightening the setscrew 110 brings the outer end of the rod 109 into frictional contact with the rod 98 to prevent relative movement therebetween.

A cylindrical upright adjustment rod 112 permits a second positional adjustment of the sensor 26 relative to the rim periphery 27. The rod 112 extends freely through a crosshole 113 in the rod 109 intermediate the inner end thereof and the rod 98. The rod 112 can be fixed in position in the hole 113 by means of a setscrew 114 bearing on it.

A cylindrical horizontal adjustment rod 115 in the subassembly 94 permits a third positional adjustment of the sensor 26 relative to the rim 14. The rod 115 extends freely through a crosshole 116 in the rod 112, which crosshole 116 is adjacent to the upper end thereof. The rod 115 is fixed in position in the crosshole 116 by a setscrew 117 which bears on the rod 115 to secure it releasably in place.

A fine adjustment sensor circuit 119 extends longitudinally and threadably through a tapped crosshole 120 adjacent the inner end of the rod 115 to provide an additional positional adjustment. Threading the carrier 119 into, and out of the crosshole 120, permits adjustment of its position relative to the inner periphery 27 of the wheel 12.

Considering now the like fine adjustment sensor carriers 89, 103 and 119 and sensors 22, 24 and 26 in greater detail, as shown in FIG. 3, the sensor 22 and the carrier 89 will now be described as being representative of the three sensors and their carriers. The carrier 89 includes a cylindrical casing 129 which has threads 130 on its outer surface. The threads 130 are engageable with the threads in the tapped crosshole 90 in the member 87. Threading the casing 129 into, or out of, the crosshole 90 moves the carrier 89, and the sensor 22, longitudinally inwardly or outwardly. The casing 89 includes a centrally and longitudinally positioned hollow interior or blind bore 132 which fixedly receives the sensor 22.

The sensor 22 includes a substantially tubular, sensor probe mounting unit 134 having one closed end and fixedly received in the bore 132. A sensor probe 138 is captured in the mounting unit 134, and is freely movable longitudinally therein. The probe is urged resiliently forwardly by a helical coil compression spring 136.

The sensor 22 includes the substantially cylindrical shank or probe 138 which is composed of an electrically conductive material, and which has a head 140 captured within the interior of the unit 134. A bore 143 in the unit 134 extends centrally and longitudinally between the outer opened end thereof and a rear wall 144. The diameter of the bore 143 is slightly greater than the outer diameter of the shank 138 to allow free axial sliding movement thereof, but is less than that of the head 140 to retain the probe 138 within an enlarged diameter portion 145 of the bore 143. An inner annular shoulder 147 serves as a stop for the head 140. The spring 136 is positioned in the enlarged portion 145 with one end bearing on the rear surface of the head 140 and the other end bearing on the end wall 144 of the bore 145. When the rim 14 of a wheel 12 under test contacts the sensor 22, the probe 138 can be urged resiliently into the bore 143. The electrical contact is maintained until the rim 14 moves apart from the sensor 22 by a distance predetermined by the physical dimensions of the probe 138 and bore 143.

As shown in FIG. 4, the sensors 22, 24 and 26 are connected by a set of respective conductors 149, 160 and 165 to one side of the respective buzzers 44, 46 and 48, the other sides thereof being electrically connected to one side of the respective lamps 43, 45 and 47 and the other sides thereof, in turn, connected in common to one terminal 49 of the battery 50.

The battery 50 is disposed within the housing 40. The terminal 52 of the battery 50 is connected by means, not shown, to the metal axle support 32. The support 32 is in electrical contact with the axle 16, which, in turn, is electrically connected via the spokes 13 to the rim 14. Thus, the rim 14 is grounded to the terminal 52.

In order to connect electrically the sensors 22 and 24 and the respective conductors 149 and 160, the sensor carriers 89 and 103 are composed of metal material and the respective conductors 149 and 160 are soldered, or otherwise electrically connected, to the respective electrically-conductive members 87 and 102, which are, in turn, connected in electrical contact with the respective sensor carriers 89 and 103. The radial sensor 26 is connected electrically directly to its conductor 165, by having the conductor 165 soldered or otherwise connected electrically to the radial sensor carrier 119.

The conductors 149, 160 and 165 are routed in the sensor support subassemblies 36 and 38 and the stand 20. As shown in FIG. 1, for example, the conductor 149 is routed in the rod 81 and the foot 54 and via a common cable 166 into the mounting 40.

Thus, when the sensors 22, 24 and 26 electrically engage or contact, respectively, the sides 23 and 25 and the inner periphery 27 of the rim 14, circuit paths are extended from the grounded rim through the sensors to the respective buzzers 44, 46 and 48 and respective lamps 43, 45 and 47 to the grounded battery 50. Therefore, the buzzers and lamps are energized when the sensors contact the rim. Conversely, when the rim and sensors move apart, become electrically disengaged, the electrical signals produced by the sensors terminate and the indicators are de-energized.

While a battery is shown and described herein, it will become apparent to those skilled in the art that other potential sources may be provided, such sources including alternating current utilizing devices (not shown). A transformer delivering a low voltage A.C. is also contemplated.

When sonic indicators are used, it is preferred that each sensor be associated with a sonic indicator which emits a sound distinguishable from the sound of any other sonic indicator. This enables an operator to determine, without having to look at the indicators, which sensor is in contact with the rim, and thus which type of misalignment is being indicated.

With visible light-emitting indicators, it is preferred that they be positioned relative to one another so that they provide readily comprehensible information as to which portion of a rim is misaligned by means of a type of analog presentation. Referring to FIGS. 2 and 4, in the triangular array of lamps 43, 45 and 47, the lamps 43 and 45 provide information that a lateral misalignment is present and whether the rim is displaced toward the radial sensor 26.

For purposes of more convenient determination of which lamp is lit, each one of the lamps 43 and 45 is of a different color.

Operation

Considering now the method of detecting and indicating misalignments of the wheel 12, assume the wheel is a newly-laced wheel and its rim is properly positioned with respect to its axle lock nuts (not shown). The stand 20 is prepared for the mounting of the wheel 12 thereon by first positioning the sensors 22, 24 and 26 out of the way of the wheel to be mounted. In this regard, the setscrews 82 and 97 are loosened and the rods 81 and 98 are rotated to move the sensors outwardly. The axle supports 32 and 34 are positioned adjustably by loosening the setscrew 66 and moving the support 34 to accommodate the length of the wheel axle 16. The wheel axle is positioned in the axle slots 72 and 74 and secured to the axle supports 32 and 34 by securing means (not shown). The wheel 12 is then placed between the sensors 22 and 24.

While it is possible with the apparatus and method of this invention simultaneously to detect and obtain indications of both lateral and radial misalignments of the wheel rim, it is preferred first to locate and then to correct lateral misalignments before locating and correcting radial misalignments. In order to locate lateral misalignments, the apparatus 10 is first adjusted to detect and to indicate major "bumps", i.e., deviations from lateral alignment, of the rim. These portions of the rim exhibiting such characteristics are then corrected by suitable adjustment to the spokes. The apparatus 10 is next adjusted to indicate smaller bumps; these are then removed in a similar manner. The apparatus 10 is then adjusted to detect and indicate still smaller bumps, if any, which are also removed similarly. These steps are repeated until the operator is satisfied with the trueness of the wheel 12. The same sequence of repeated detection and indication, followed by adjustment, is carried out when correcting concentric or radial misalignments.

To detect and obtain indications of lateral misalignments, the rods 81 and 98 are rotated about their respective axes to bring the sensors 22 and 24 toward the adjacent sides of the rim until the sensors 22 and 24 are spaced from the adjacent sides 23 and 25 of the rim. The setscrews 82 and 97 are then tightened. The position of the radial sensor 26 is then adjusted relative to the inner periphery of the rim 14 by loosening the setscrew 114 and sliding the rod 112 in the desired direction. The setscrew 114 is then tightened.

The left and right sensors 22 and 24 are then advanced toward the rim sides 23 and 25, respectively, by first loosening the setscrews 86 and 101, then by sliding the coarse adjustment rods 83 and 99 inwardly. The setscrews 86 and 101 are then tightened to fix the rods 83 and 99 releasably in place. The initial setup of the sensors 22 and 24 on the rim sides 23 and 25 is carried out by threading the sensor carriers 89 and 103 inwardly so that the left and right sensors 22 and 24 are moved axially inwardly toward the adjacent sides of the rim until the sensors 22 and 24 are spaced slightly from the rim. During the fine adjustment procedure, should the sensors contact the rim, the indicator devices provide information as to that occurrence. In such a situation, the sensors are backed slightly away from the rim sides 23 and 25 by threading the sensor carriers 89 and 103 outwardly.

It is preferred to position the left and right sensors by approximately the same predetermined distances from the adjacent sides of the rim to facilitate proper misalignment indications. The magnitude of the bumps detectable depends on the distance between a side of the rim 14 and a sensor. The amount of this distance is governed by the number of revolutions the sensor carriers are threaded outwardly.

For detection purposes, the wheel is then slowly rotated, manually. If the rim moves through the predetermined distance toward a sensor to a certain point of contact with the sensor, the rim and sensor make electrical contact and the indicators associated therewith are actuated. When the rim moves backwardly away from the sensor past the point of contact therewith, the electrical contact is broken, and the signal to the indicator terminates. When an indicating device is actuated, rotation is stopped, and the direction of misalignment is noted by determining which lamp is lit and which sound is heard. Thus, the location of a misaligned portion of the rim 14 is isolated to that section which is in contact with the right or left sensor.

The misalignment of the isolated rim portion is then corrected by adjusting the tension of the appropriate wheel spokes.

This procedure is carried out with every bump detected until no indicating devices are actuated when the wheel is rotated through 360°. The sensors 22 and 24 are next moved incrementally inwardly toward one another to space them more closely by another and shorter predetermined distances from the respective sides of the rim. The wheel is then rotated and the operation repeated to make further corrections until no bumps are detected. The left and right sensors are then moved inwardly toward one another by still shorter predetermined distances, and the sequence of operations repeated until the operator is satisfied that the wheel 12 has been properly trued.

In order to detect radial misalignments, the radial sensor 26 is set up initially by adjusting the angular positioning of the sensor 26 by loosening the setscrew 110, rotating the rod 109 until a desired angular position of the sensor is attained, then tightening the setscrew 110. A coarse adjustment is then made of the radial and angular position of the sensor 26 by loosening the setscrew 114, sliding and rotating the rod 112 in the hole 113 until the rod 115 is substantially parallel to the axle of the wheel 12 and the desired vertical position is attained, then tightening the setscrew 114.

A finer adjustment is next made of the lateral and angular position of the sensor 26 by loosening the setscrew 117 and sliding and rotating the rod 115 in the hole 116 until the sensor carrier 119 lies substantially on a radius of the wheel 12 and the sensor 26 is positioned opposite the inner periphery 27 of the rim 14 and adjacent to the outer margin thereof to avoid contact with the wheel spokes 13. The setscrew 117 is then tightened, when the radial sensor 26 is spaced by a small distance from the inner periphery.

The radial sensor is next moved radially to a predetermined distance away from the adjacent portion of the rim by means of the radial sensor carrier 119. It will be apparent that positioning the sensor 26 relative to the surface 27 of the rim 14 enables wheel non-circularities to be detected without the need for the tire 15 to be removed from the rim 14.

In a manner similar to that described hereinabove for removal of lateral misalignments, the more gross radial misalignments are detected and removed first, then the smaller ones are adjusted. To do this, the wheel 12 is rotated manually until the indicating devices 47 and 48 are actuated when the rim moves through the predetermined distances to a certain position in contact with the radial sensor to produce a radial electrical signal. Rotation of the wheel 12 is then stopped and the tension on the appropriate spokes are adjusted to remove the radial misalignments at that portion of the rim. The radial signal terminates when the rim moves backwardly away from the radial sensor past the certain position of contact with the sensor. This procedure is repeated until the indicating devices 47 and 48 are no longer actuated when the wheel 12 is rotated 360°.

The radial sensor 26 is then advanced incrementally toward the inner periphery of the rim, within a shorter predetermined distance relative thereto. Thereupon, the wheel is rotated and the spokes are adjusted. The steps of the operation are repeated continuously until the operator is satisfied with the roundness of the wheel 12.

After lateral misalignments have been removed, the axial centering of the rim 14 between the axle nuts (not shown) of the wheel 12 can be checked by first bringing the sensors 22 and 24 into contact, respectively, with the sides 23 and 25 of the rim 14 so that the indicating devices 43 and 45 are first actuated. With a properly aligned wheel 12, the indicating devices 43 and 45 are actuated during a 360° rotation of the wheel 12. Without changing the adjustment of the position of the sensors 22 and 24, the wheel 12 is slipped from between the sensors and is removed from the stand 20. The wheel is then rotated through 180° about its vertical axis extending normal to the axle 16. Thereafter, the axle 16 is secured in the slots 72 and 74 with the rim 14 disposed between the sensors. If both lamps 43 and 45 are lit, the rim is properly positioned relative to the lock nuts. The wheel 12 may then be rotated for sake of accuracy.

Alternative Embodiments

Referring now to FIG. 5 of the drawings, there is disclosed a spoke wire wheel misalignment detection and indicating apparatus 180, which is constructed in accordance with the present invention and which is similar to the apparatus 10 of FIG. 1 except that the apparatus 80 includes a circuit 182 for producing audibly-perceptible signals of a continuously variable pitch to indicate the magnitude of the rim misalignment.

The circuit 182 includes a series of three right, left and radial sensors 184, 186 and 188 which are connected electrically to the inputs of a series of three voltage controlled oscillators 190, 192 and 194, respectively. A series of three speakers 196, 197 and 198 are connected, respectively, to the outputs of the voltage controlled oscillators for producing the variable-pitch, audibly-perceptible signals. A series of three lamps 199, 201 and 202 are connected in parallel with the respective speakers 196, 197 and 198, which lamps are similar to the lamps 43, 45 and 47 of the apparatus 10.

The sensors are pickup coils of a variable reluctance to serve as metal detectors for sensing the presence of the metallic wheel rim. As the rim moves closer to the sensors, the reluctance changes to provide a variation in the amplitude of the output signal of its corresponding voltage-controlled oscillator. The sensors 184 and 186 are the respective right sensor and left sensor corresponding to the right and left sensors of the apparatus 10 of FIG. 1. Similarly, the sensor 188 is the radial sensor similar to the radial sensor of the apparatus of FIG. 1.

In operation, the method of operation of the apparatus 180 is similar to the operation of the apparatus 10, except that the sensors 184, 186 and 188 are positioned at a slightly greater distance from their respective positions adjacent to the rim to allow for greater movement thereof toward and away from the sensors.

As the rim moves toward and away from the respective sensors, the respective voltage-controlled oscillators 190, 192 and 194 produce variable amplitude output signals proportional to the deviation of the rim. Once the rim moves through a predetermined distance toward one of the sensors, the sensor is actuated, until the rim moves through a second predetermined distance away from the sensor to deactivate it. Thus, the respective speakers 196, 197 and 198 produce audibly-perceptible signals which vary in pitch in proportion to the relative displacement of the rim when the corresponding sensors are activated. Also, the visually-perceptible signals produced by the lamps 199, 201 and 202 vary in intensity with the electrical output signals from the respective oscillators 190, 192 and 194. The voltage-controlled oscillators are set to produce three different ranges of output voltages so that the speakers and lamps produce three different ranges of audibly-perceptible and visually-perceptible signals.

Figure 6:
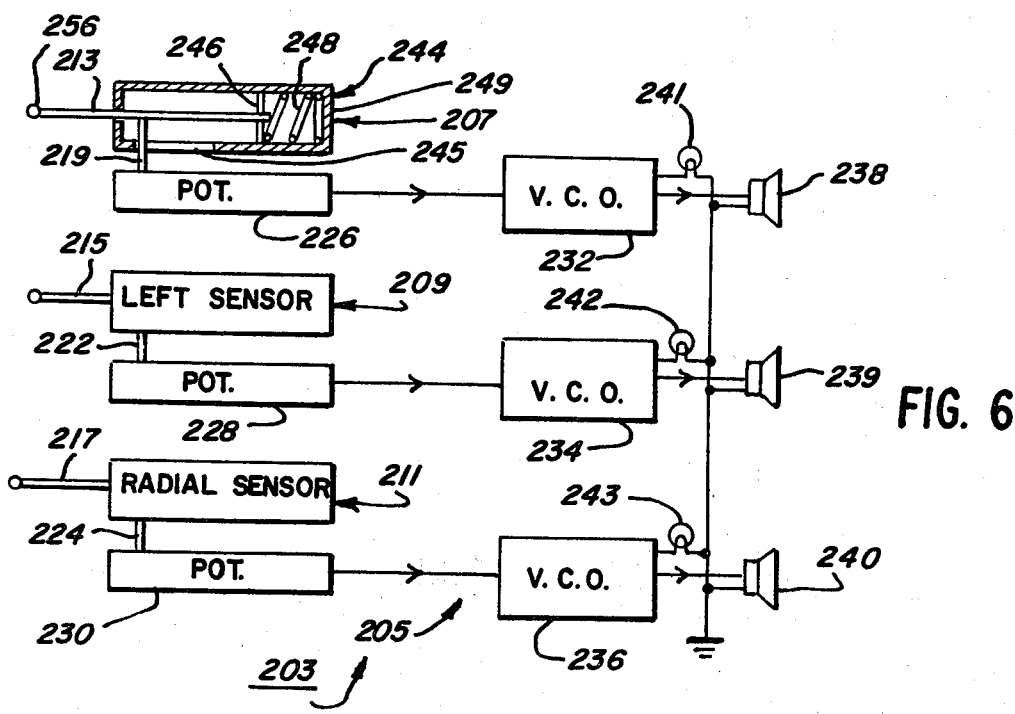
FIG. 6 is a schematic diagram of still another wire spoke wheel misalignment detecting and indicating apparatus, which is also constructed in accordance with the present invention.

Referring now to FIG. 6 of the drawings, there is shown a wire spoke wheel misalignment detecting and indicating apparatus 203, which is constructed in accordance with the present invention, and which is generally similar to the apparatus 10 of FIG. 5 in that continuously variable signals are produced.

The apparatus 203 includes a circuit generally indicated at 205, which is similar to the circuit 182 except that the circuit 205 employs sensors 207, 209 and 211 having spring-loaded probes 213, 215 and 217, which continuously engage and follow the rim (not shown) as it rotates about its axis. The sensors include respective actuator arms 219, 222 and 224 which control a set of respective potentiometers 226, 228 and 230 for producing electrical output signals and for supplying them to the inputs of set of respective voltage-controlled oscillators 232, 234 and 236, similar to the oscillators of FIG. 5. A series of three speakers 238, 239 and 240 are connected to the outputs of the respective voltage-controlled oscillators 232, 234 and 236 to produce audibly-perceptible signals, in a similar manner as the voltage-controlled oscillators and speakers of the circuit 182 of FIG. 5. Also, in a similar manner as indicated in FIG. 5, a set of lamps 241, 242 and 243 are connected in parallel with the respective speakers 238, 239 and 240.

The sensors are similarly constructed, and only the sensor 207 will now be described in greater detail. The sensor 207 includes an elongated housing 244 having an elongated opening 245 through which the actuator 219 extends to the potentiometer 226. The probe 213 is in the form of an elongated rod, and a rear plate 246 is fixed to the probe 213. A spring 248 is compressed between the rear plate 246 and a rear wall 249 of the housing 244 for urging resiliently the enlarged front end 256 into engagement with the wheel rim.

The sensors 207, 209 and 211 are positioned in a similar manner as the respective right, left and radial sensors of the apparatus 10 of FIG. 1. Each one of the probes 213, 215 and 217 are moved into engagement with the wheel rim, and the rim moves the probes continuously as the rim is rotated about its axis.

Each one of the potentiometers are wound such that a signal is supplied therefrom to its voltage-controlled oscillator only after the rim moves through a predetermined distance toward the sensor to a certain position, and the signal terminates after the rim moves backwardly relative to the sensor past the certain position. Thus, as the rim moves forwardly past the certain position, the signal supplied to the oscillator has continuously-increasing amplitude.

After reviewing the foregoing description, it will become apparent to those skilled in the art that in accordance with the present invention, there is provided an apparatus having right and left sensors which are adapted to be positioned on opposite sides of a wheel under test, and which produce a right or left electrical signal when the wheel and a right or left sensor, respectively, move, relative to one another, through a predetermined distance to a certain position. The right or left signal terminates when the wheel and a sensor move backwardly away from one another past the certain position. The right and left electrical signals are conveyed respectively to right and left indicating devices, which provide respectively, right and left lateral misalignment information. The method for detecting and indicating wheel misalignment includes the steps of placing the wheel between two spaced-apart oppositely-disposed misalignment sensors, rotating the wheel about its axis, producing electrical signals in response to the sensors detecting wheel misalignments, and observing indicating devices which respond to the electrical signals when the sensors detect misalignments of the wheel.

While the preferred embodiments of the present invention have been illustrated and described, it will be apparent that other changes, modifications and applications may be made within the spirit and scope of the invention. It is intended that all such changes, modifications and applications be included within the scope of the appended claims.

I claim:

1. An apparatus for detecting and indicating misalignments of the rim of a wire spoke wheel relative to its axle as the wheel rotates about its axis, comprising:

right sensing means (including electrical switch means mounted adjacent to one side of the wheel) for producing a right electrical signal by establishing a right electrical circuit path in response to relative movement of the wheel and said right sensing means toward one another through a right predetermined distance to a certain position and for alternatively terminating said right electrical signal by said right electrical circuit path in response to the wheel and said right sensing means moving backwardly past said certain position relative to one another;

left sensing means (including electrical switch means mounted adjacent to the other side of the wheel) for producing a left electrical signal by establishing a left electrical circuit path in response to relative movement of the wheel and said left sensing means toward one another through a left predetermined distance to a certain position and for alternatively terminating said left electrical signal by opening said left electrical circuit path in response to the wheel and said left sensing means moving backwardly past said certain position relative to one another;

electrical circuit means, including conductor means forming a portion of the electrical circuit paths, responsive to said sensors for conveying said pair of right and left electrical signal remotely therefrom; and a pair of first and second indicating devices connected to said electrical circuit means and closely spaced together remotely to at least one of said sensors for providing lateral misalignment information in response to either the respective right electrical signal or the left electrical signals or both of them simultaneously.

2. The apparatus of claim 1 further including:

a radial sensing means adapted to be positioned adjacent to the wheel for producing a radial electrical signal in response to relative movement of the wheel and one another through a radial predetermined distance to another certain position and alternatively terminating said radial electrical signal in response to the wheel and radial sensing means moving relative to one another backwardly past another certain position;

electrical circuit means responsive to said radial sensor for conveying saod electrical signal; and an indicating device connected to said radial-responsive circuit means for providing radial misalignment information in response to the radial electrical signal.

3. The apparatus of claim 2 further including a set of first, second and third sound-emitting indicating devices, responsive respectively to the right lateral, left lateral and radial misalignment electrical signals, for providing misalignment information.

4. The apparatus of claim 1 wherein the rim is electrically conductive and each of said electrical switch means of said sensors includes electrically-conductive probes for electrical engagement with the rim to activate said circuit means.

5. The apparatus of claim 1 further including:

a stand having a base;

means on said base for mounting the wheel for rotation about its axis;

mounting means on said base for holding adjustably said sensors on opposite sides of the wheel;

means on said base for mounting said indicating devices.

6. The apparatus of claim 5:

wherein said mounting includes means for coarse and for fine adjustments of the positions of said sensors relative to the wheel;

wherein said first, second and third indicating devices emit visible light in response to the respective right, left and radial electrical signals; and further including means for positioning said first, second and third visible light-emitting indicating devices in a closely spaced-apart relationship to enable an operator simultaneously to observe all three of said devices conveniently without having to move the head or to shift the vision of the operator.

7. The apparatus of claim 1, wherein said electrical circuit means includes voltage-controlled oscillators responsive to the electrical signals produced by each one of said sensing means for energizing said devices.

8. The apparatus of claim 1, wherein each one of said sensing means includes a spring-loaded probe for engaging the rim as it rotates about its axis, and said circuit means includes a potentiometer responsive to at least one of the electrical signals for energizing at least one of said indicating means, each one of said electrical signals being continuously variable so that said potentiometer causes at least one of said indicating means to produce a continuously variable signal.

9. A method for detecting and indicating misalignments of a wire spoke whell having an axle, which method comprises the steps of:

mounting the wheel for rotation about the axis of the axle;

disposing the wheel between a pair of spaced-apart oppositely disposed right and left lateral misalignment sensors including electrical switch means;

positioning said switch means of the sensors adjacent to the wheel on opposite sides thereof;

rotating the wheel about its axis;

sensing lateral misalignments of the wheel with said switch means of the sensors;

establishing right and left electrical circuit paths to produce right and left electrical signals associated with the respective sensors when the wheel moves through respective predetermined distance toward said sensors to certain respective positions;

indicating lateral misalignment information at a position remote to at least one of said sensors, in response to either the right or the left electrical signals or both of them simultaneously; and opening said right and left electrical circuit paths to terminate said right and left electrical signals when the wheel moves backwardly past the respective certain positions.

10. The method of claim 9 further including the steps of:

positioning a radial misalignment sensor adjacent the wheel;

sensing radial misalignment of the wheel with the radial sensor;

producing radial electrical signals associated with the radial sensor when the wheel moves through a predetermined radial distance toward the radial sensor to another certain position;

indicating radial misalignment information in response to said radial electrical signal; and terminating said radial electrical signals when the wheel moves backwardly past the said another certain position.

* * * * *

UNITED STATES PATENT AND TRADEMARK OFFICE
CERTIFICATE OF CORRECTION

PATENT NO. : 4,417,237

DATED : November 22, 1983

INVENTOR(S) : John K. Korth

It is certified that error appears in the above-identified patent and that said Letters Patent is hereby corrected as shown below:

Column 14, line 22 after "electrical", delete "signal" and substitute --signals-- therefor.

Column 14, line 32, after "adjacent", delete "to".

Column 14, line 34, after "wheel", insert --said radial sensing means toward--.

Column 14, line 39, after "past", insert --said--.

Column 14, line 41, delete "saod", and substitute --said-- therefor.

Column 15, line 27, delete "whell", and substitute --wheel-- therefor.

Signed and Sealed this

Fourth Day of December 1984

[SEAL]

Attest:

Attesting Officer

GERALD J. MOSSINGHOFF

Commissioner of Patents and Trademarks